3,026,328
PROCESSES FOR CONVERTING L-THREO-5-AMINO-6-PHENYL DIOXANE TO THE CORRESPONDING L-ERYTHRO DIOXANE
Franz Braun, Ludwigshafen (Rhine)-Oppau, and Erich Haack, Heidelberg, Germany, assignors to C. F. Boehringer & Soehne G.m.b.H., Mannheim-Waldhof, Germany, a corporation of Germany
No Drawing. Filed Dec. 22, 1958, Ser. No. 781,845
Claims priority, application Germany Dec. 24, 1957
5 Claims. (Cl. 260—340.7)

The present invention relates to an improved process of producing L-erythro-5-amino-6-phenyl dioxane-1,3 compounds.

In a known synthesis of D-threo-1-(p-nitro phenyl)-2-dichloro acetamido propanediol-1,3, i.e. the antibiotic chloramphenicol, the racemic intermediate DL-threo-5-amino-6-phenyl dioxane-1,3 compounds which may be substituted in the aromatic nucleus must be resolved into their optically active components. Such compounds correspond to the general formula

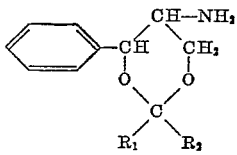

wherein $R_1$ and $R_2$ are hydrogen, unsubstituted or substituted alkyl, aryl, aralkyl, hydroaromatic, or heterocyclic radicals or, together with the carbon atom to which they are attached, may form a carbocyclic ring and wherein $R_1$ and $R_2$ may represent the same or different substituents. For the conversion into chloramphenicol only the compounds of the D-threo group can be used. The L-threo-5-amino-6-phenyl dioxane compounds which are their antipodes, heretofore, had to be discarded and could not be used in the preparation of chloramphenicol.

It is one object of the present invention to provide a simple and effective process for the configurative conversion of such L-threo-5-amino-6-phenyl dioxane compounds into the corresponding L-erythro-5-amino-6-phenyl dioxane compounds which may further be processed to chloramphenicol by using conventional methods.

Other objects of the present invention and advantageous features thereof will become apparent as the description proceeds.

It has been found that the reaction involved in the process according to the present invention is not a racemization but a total inversion of the configuration at the carbon atom in position 5 of the dioxane ring. This finding, therefore, is of considerable importance with respect to the chemistry and manufacture of chloramphenicol. It permits to synthesize this important antibiotic from cinnamic alcohol by utilizing all of the starting material because it is now possible to convert the "wrong" enantiomorphic form into a suitable enantiomorphic isomer.

Surprisingly it has been found that oxidation, to the nitro group, of the amino group of L-threo-5-amino-6-phenyl dioxane-1,3 compounds of the above described formula predominantly takes place with inversion of the configuration on carbon atom 5, so that L-erythro-5-nitro-6-phenyl dioxane-1,3 compounds are obtained. These compounds are readily reduced and the corresponding L-erythro-5-amino-6-phenyl dioxane-1,3 compounds are obtained in a simple manner and in practically quantitative yield. After acylation of the amino group and splitting up of the dioxane ring the resulting compounds can be converted into chloramphenicol by sterically changing the carbon atom 1 of the propane chain according to known methods (see, for instance, German Patent No. 876,097) and proceeding according to the "cinnamic alcohol-dioxane process" in future reaction steps.

The nitro dioxane compounds are obtained in practically quantitative yields. Ordinarily more than 80% thereof are present in the erythro-configuration directly after oxidation according to the process of the present invention. Any nitro dioxane compounds which are still present in the threo-configuration may be rearranged to form the erythro-form by producing the aci-nitro salts thereof, removing impurities from the salt solutions by extraction with water insoluble organic solvents, and restoring the nitro compounds by acidifying. The steps of forming the aci-nitro salts and acidification may be repeated if necessary. Thus, quantitative rearrangement to the erythro-configuration is achieved.

In carrying out the process according to the present invention the resulting erythro compound can be separated each time it is obtained. The preferred technical procedure, however, is to directly reduce the mixture consisting predominantly of the erythro-nitro compound and, to a lesser extent, of the unreacted threo-nitro compound, to separate the threo-amino dioxane which may be present in the reaction mixture, and to recycle said threo-amino dioxane.

When using the step of forming the aci-nitro compound, it is of advantage to acidify the salt solution in the presence of agents capable of binding nitrite, such as hydroxylamine or urea, in order to restore the nitro compound.

The oxidation of the threo-amino dioxanes is carried out under such conditions that no cleavage of the dioxane ring takes place. Heretofore, no fully satisfactory methods of converting an amino group into a nitro group were available. Oxidizing agents such as peroxy trifluoro acetic acid and peracetic acid are suitable for this purpose. They are, however, rather expensive and not easily available in large quantities.

According to a specific embodiment of the present invention it has been found that the adducts of hydrogen peroxide and urea compounds are especially suitable oxidizing agents for this purpose. Thereby, almost quantitative yields of the nitro compounds are obtained without formation of compounds of lower oxidation stages such as nitroso compounds.

Another process of converting the amino group into a nitro group consists in first preparing and isolating the corresponding oxime and then oxidizing said oxime to the nitro compound.

Reduction of the nitro group to form the amino group may be carried out according to methods known before, for instance, by catalytic reduction with Raney nickel.

The following example serves to illustrate the present invention without, however, limiting the same thereto.

*Example 1*

24.0 g. of the urea-hydrogen peroxide addition compound (containing 35.4% of $H_2O_2$) are dissolved at 60° C. in 150 cc. of acetonitrile while stirring. A solution containing 3.22 g. of sodium molybdate in 12.5 cc. of glacial acetic acid and 25.0 g. of sodium sulfate are added. To the resulting mixture there is added at 50° C. a solution containing 51.82 g. of L(+)-threo-2,2-dimethyl-5-amino-6-phenyl dioxane-1,3 ($[\alpha]_D^{20}=52.5°$; concentration: 2% in methanol) in 25 cc. of acetonitrile while stirring. At intervals of 30 minutes there are then added twice 24.0 g. of the urea-hydrogen peroxide adduct to the reaction mixture. Stirring is continued at 50° C. for a total of 2½ hours. The brownish oxidation solution is then mixed with 10 cc. of glacial acetic acid and heated to 80° C. for 10 minutes. Another 24.0 g. of the urea-hydrogen peroxide adduct are added and stirring is continued at 80° C. for 2 hours. The reaction mixture is cooled to room temperature and a solution containing 35 g. of sodium bicarbonate in 450 cc. of water is added. The oil precipitated thereby is removed by extracting it three times with chloroform, each time with 150 cc. After drying and distilling off the extracting solvent in a vacuum, 56.65 g. of the crude nitro compound are obtained containing about 85% of erythroform. Yield: 95.6% of the theoretical amount.

The crude product is mixed with 244 cc. of N sodium hydroxide solution and stirred at 60° C. for 10 minutes. The turbid red-brown solution is shaken first with 75 cc. of ether at 10° C. and then twice with 50 cc. of ether each. The ether extracts are discarded. The clear aqueous alkaline solution is mixed with 1.25 g. of urea and cooled to 0° C. 244 cc. of N sulfuric acid are added within 80 minutes while stirring and keeping the reaction temperature at 0° C. The precipitated oil is rapidly separated by extracting it three times with ether, each time with 150 cc. After evaporation of the ether 51.25 g. of L-erythro-2,2-dimethyl-5-nitro-6-phenyl dioxane-1,3 are obtained which, in the pure state, is a colorless slightly viscous oil; yield: 86.5% of the theoretical amount. $[\alpha]_D^{20} = -52.2°$ (concentration: 2% in methanol).

Analysis.—$C_{12}H_{15}NO_4$; molecular weight: 273.3. Calculated: 60.75% C; 6.37% H; 5.90% N. Found: 60.71% C; 6.38% H; 5.42% N.

To 16 g. of hydrogen-saturated Raney nickel in 100 cc. of methanol there is added drop by drop a solution of 51.25 g. of the above mentioned nitro compound in 450 cc. of methanol within four hours while keeping the mixture at room temperature under hydrogen at atmospheric pressure and shaking vigorously. By blowing cold air against the hydrogenation vessel, the temperature of the reaction mixture is maintained at 30° C. After 4 hours and 20 minutes 16,210 cc. of hydrogen at a pressure of 766 mm. Hg and a temperature of 22° C. (corresponding to 14,730 cc. at a pressure of 760 mm. Hg and a temperature of 0° C.) have been absorbed. This amount corresponds to the calculated amount. Thereafter, hydrogen absorption is completed. The catalyst is filtered off by suction and the methanol is evaporated in a vacuum. 44.4 g. of a light yellow oil are obtained which rapidly solidifies yielding crystals of the melting point 38–40° C. The yield is 85.5% of the theoretical amount calculated for the L(+)-threo-2,2-dimethyl-5-amino-6-phenyl dioxane-1,3 used as starting material. On recrystallization from petroleum ether, the pure L(−)-erythro-2,2-dimethyl-5-amino-6-phenyl-1,3 dioxane melts at 50–51° C. $[\alpha]_D^{20} = -5.5°$ (concentration: 2% in methanol).

Analysis.—$C_{12}H_{17}O_2N$; molecular weight: 207.3. Calculated: 69.54% C; 8.27% H; 6.76% N. Found: 69.55% C; 8.40% H; 6.64% N.

As stated hereinabove, it is, of course, also possible to use other methods for converting the amino group into a nitro group, and to again reduce the nitro group to the amino group. Likewise, the methods of working up the reaction mixtures and of purifying the reaction products may be varied by those skilled in the art in accordance with the principles set forth herein and in the claims annexed hereto.

For instance, in place of L(+)-threo-2,2-dimethyl-5-amino-6-phenyl dioxane-1,3 used as starting material in the preceding example, there can be employed the corresponding oximino compounds, i.e the L(−)-2,2-dimethyl-5-oximino-6-phenyl dioxane-1,3:

*Example 2*

55.31 g. of L(−)-2,2-dimethyl-5-oximino-6-phenyl dioxane-(1,3) (melting point 137–138° C., $$[\alpha]_D^{20} = -87.1°$$

concentration: 2% in methanol), prepared by oxidation of L(+)-threo-2,2-dimethyl-5-amino-6-phenyl dioxane-(1,3) with 33% aqueous hydrogen peroxide solution and tungstic acid according to the process described in German Patent No. 939,808 (yield: 93%), are added to a solution containing 30.01 g. of urea-hydrogen peroxide addition compound, 3.22 g. of sodium molybdate, 3.84 g. of anhydrous sodium acetate, and 25 g. of sodium sulfate in 150 cc. of anhydrous acetonitrile and 15 cc. of glacial acetic acid, said solution being prepared in an analogous manner as described in the preceding example. The resulting mixture is heated to 80° C. while stirring. After 30 minutes 6.0 g. of the urea-hydrogen peroxide adduct and after another 30 minutes further 12.01 g. of the said adduct are added. Stirring is continued at 80° C. for 1 hour. The resulting mixture is then cooled to 20° C. and a solution containing 27 g. of sodium bicarbonate in 450 cc. of water is added. The oil precipitated thereby is removed by extracting it three times with chloroform, each time with 150 cc. After drying and distilling off the solvent in a vacuum, 56.84 g. of the crude nitro dioxane containing about 83% of the erythroform are obtained. Yield: 95.8% of the theoretical amount.

The crude nitro compound is completely converted into the L-erythro-nitro dioxane compound and purified in an analogous manner as described in the preceding example. 54.57 g. of L(−)-erythro-2,2-dimethyl-5-nitro-6-phenyl dioxane-1,3 are obtained in the form of a light yellow oil; yield: 92.2% of the theoretical amount.

The reduction of this nitro dioxane is performed in the same manner as described in the preceding example. 47.09 g. of a light yellow oil are obtained which rapidly solidifies yielding crystals of the melting point 40–49° C. The yield is 90.8% of the theoretical amount calculated for the L(−)-2,2-dimethyl-5-oximino-6-phenyl dioxane-1,3 used as starting material. On recrystallization from petroleum ether, the pure L(−)-erythro-2,2-dimethyl-5-amino-6-phenyl dioxane-1,3 melts at 50–51° C.; $[\alpha]_D^{20} = -5.5°$ C. (concentration: 2% in methanol).

The amino dioxane compounds used as starting materials in the process of the present invention are readily obtained, for instance, by reacting cinnamyl alcohol bromohydrin (i.e. 1-phenyl-2-bromo propanediol-1,3) with an aldehyde or ketone, aminating the resulting 6-phenyl-5-bromo dioxane-(1,3- compound, resolving the resulting threo-6-phenyl-5-amino dioxane-(1,3) compound to isolate the D-(−)-threo-form which is converted into chloramphenicol by dichloro acetylation, nitration, and hydrolysis.

The L(+)-threo-5-amino-6-phenyl dioxane-1,3 compound obtained in said resolution step as by-product is subjected to the process according to the present invention and yields the corresponding L-erythro-compound which, as shown hereinabove, can also readily be converted into chloramphenicol.

We claim:

1. L(−)-2,2-dimethyl-5-oximino-6-phenyl dioxane-1,3.
2. In a process for the preparation of L(−)-erythro-2,2-dimethyl-5-amino-6-phenyl dioxane-1,3, the steps which comprise oxidizing L(+)-threo-2,2-dimethyl-5-amino-6-phenyl dioxane-1,3 by means of the adduct of urea and hydrogen peroxide to form L(−)-erythro-2,2-dimethyl-5-nitro-6-phenyl dioxane-1,3 and subjecting said L(−)-erythro-2,2-dimethyl-5-nitro-6-phenyl dioxane-1,3 to catalytic hydrogenation.
3. In a process for the preparation of L(−)-erythro-2,2-dimethyl-5-amino-6-phenyl dioxane-1,3, the steps which comprise oxidizing L(+)-threo-2,2-dimethyl-5-oximino-6-phenyl dioxane-1,3 by means of the adduct of urea and hydrogen peroxide to form L(−)-erythro-2,2-dimethyl-5-nitro-6-phenyl dioxane-1,3 and subjecting said L(−)-erythro-2,2-dimethyl-5-nitro-6-phenyl dioxane-1,3 to catalytic hydrogenation.
4. In a process for the preparation of L(−)-erythro-2,2-dimethyl-5-amino-6-phenyl dioxane-1,3, the steps which comprise oxidizing L(+)-threo-2,2-dimethyl-5-amino-6-phenyl dioxane-1,3 by means of the adduct of urea and hydrogen peroxide to form a crude oxidation product containing L(—)-erythro-2,2-dimethyl-5-nitro-6-phenyl dioxane-1,3, dissolving said oxidation product in an alkali metal hydroxide solution, adding to the resulting solution a nitrite binding agent selected from the group consisting of hydroxylamine and urea, acidifying said reaction solution, whereby L(—)-erythro-2,2-dimethyl-5-nitro-6-phenyl dioxane-1,3 is liberated, and subjecting the latter compound to catalytic hydrogenation.

5. In a process for the preparation of L(—)-erythro-2,2-dimethyl-5-amino-6-phenyl dioxane-1,3, the steps which comprise oxidizing L(+)-threo-2,2-dimethyl-5-oximino-6-phenyl dioxane-1,3 by means of the adduct of urea and hydrogen peroxide to form a crude oxidation production containing L(—)-erythro-2,2-dimethyl-5-nitro-6-phenyl dioxane-1,3, dissolving said oxidation product in an alkali metal hydroxide solution, adding to the resulting solution a nitrite binding agent selected from the group consisting of hydroxylamine and urea, acidifying said reaction solution, whereby L(—)-erythro-2,2-dimethyl-5-nitro-6-phenyl dioxane-1,3 is liberated, and subjecting the latter compound to catalytic hydrogenation.

References Cited in the file of this patent

UNITED STATES PATENTS 2,718,527    Heywood _____ Sept. 20, 1955

OTHER REFERENCES

Lowy et al.: An Introduction to Organic Chemistry, seventh edition, page 263 (1951).